May 6, 1930.  E. B. FLANIGAN  1,757,011
VEHICLE BRAKE
Filed Feb. 16, 1926
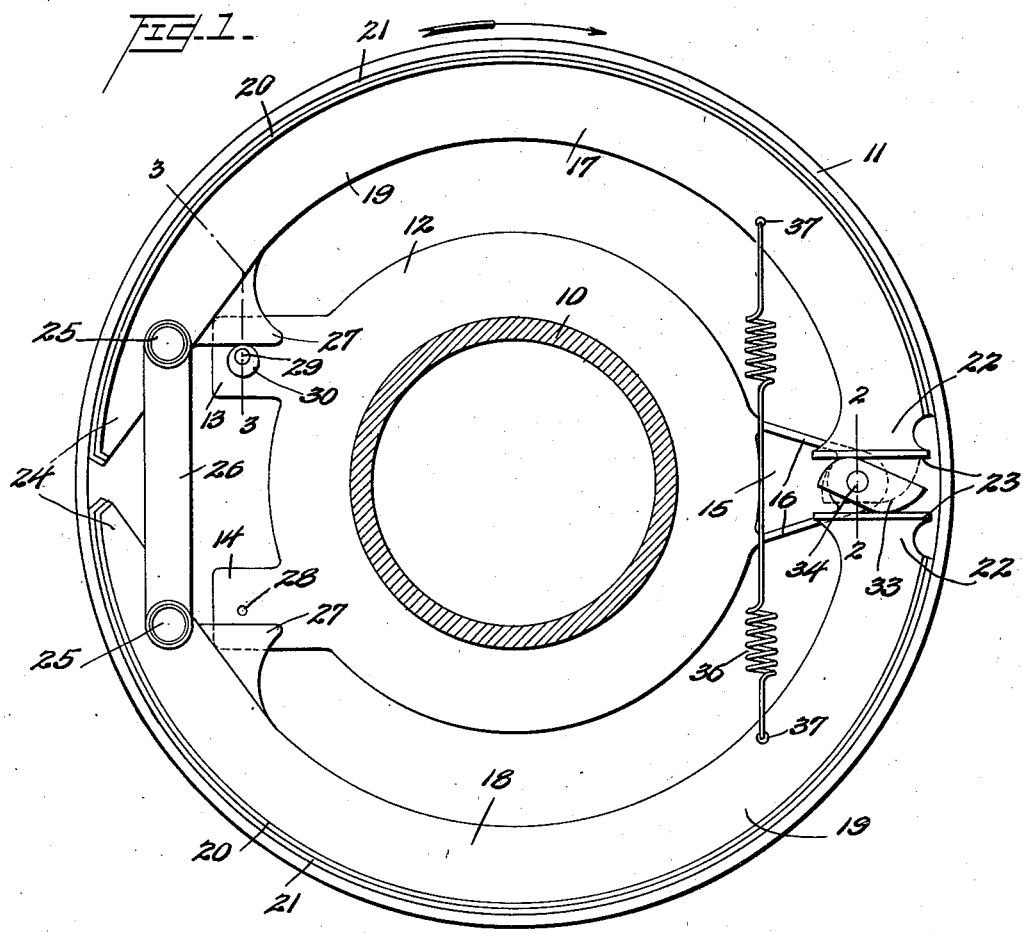
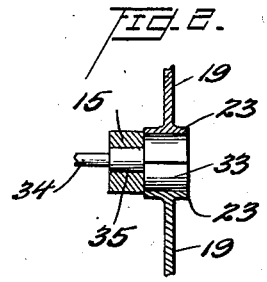
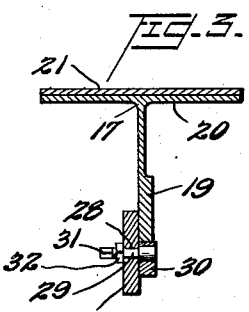
Inventor
By Edwin B. Flanigan,
Watson, Coit, Moser + Grindle,
Attorney Patented May 6, 1930

1,757,011

UNITED STATES PATENT OFFICE

EDWIN B. FLANIGAN, OF WILKES-BARRE, PENNSYLVANIA, ASSIGNOR TO E. B. FLANIGAN, INCORPORATED, OF WILKES-BARRE, PENNSYLVANIA, A CORPORATION OF PENNSYLVANIA

VEHICLE BRAKE

Application filed February 16, 1926. Serial No. 88,634.

This invention relates to brakes, and more particularly to vehicle brakes.

A general object of the present invention is to provide a novel and improved form of vehicle brake.

More particularly it is an object of the present invention to provide an internal expanding brake of simplified form which is of the servo or self-actuating type.

Another object of the present invention consists in the provision of an internal expanding brake provided with a plurality of shoes, linked together, and adapted for slight partial rotation within the brake drum and actuated by an expanding mechanism which also serves to take the reaction of one of the shoes.

Other and further objects of the invention will be more apparent as the description proceeds.

In the accompanying drawings and following specification there is disclosed a single exemplary embodiment of the present invention with the understanding, however, that various changes can be made therein by those skilled in the art without departing from the spirit thereof or the scope of the appended claims.

In said drawings:

Figure 1 is a side elevation of a vehicle brake constructed according to the present invention, the supporting tube being shown in section;

Figure 2 is a transverse vertical section on line 2—2 of Figure 1; and

Figure 3 is a transverse vertical section on line 3—3 of Figure 1.

Referring to the drawings there is disclosed at 10 an axle tube or other stationary part of a vehicle about which is adapted to be rotated the brake drum 11 attached to any suitable form of vehicle wheel, not shown. Figure 1 is considered to be looking into the brake drum from its open side. This brake drum is of the usual construction and as viewed in Figure 1 is considered to rotate in the direction of the arrow when the vehicle is moving in a forward direction. Attached to the part 10 is what may be termed a brake spider 12 of any suitable form and rigidly and non-rotatably secured to the part 10. This spider is reversible so that but one style need be made for use on either right or left hand wheels. It is provided with a pair of ears 13 and 14 projecting parallel to each other at the rear side of the axle tube. At the front side the spider is provided with the lug 15 suitably reinforced by the flanges 16.

A plurality, here shown as two, of brake shoes or bands 17 and 18 are provided. In the form shown each of the brake shoes is slightly less than semicircular. In transverse cross section each shoe is T-shaped, as best shown in Figure 3, having the web 19 and the flange 20 upon which is mounted in any well known manner a suitable friction lining 21. The shoes 17 and 18 are identical and reversible and thus simple to manufacture. Each shoe is provided at one end with an enlargement 22 on the web 19 to which is secured a transverse flange 23 for a purpose to be hereinafter described. This flange is so positioned that its face is parallel to the diameter normal to the bisecting diameter of the arc of the shoe. At the opposite end each shoe is tapered off as shown at 24 and near the end of the tapered portion of the web is provided with a perforation to receive a stud 25. The stud 25 in each shoe passes respectively thru one end of a connecting link 26 which secures the tapered ends of the shoes together. The link is loosely mounted on the studs 25.

Each shoe is also provided with an inward extension 27 from its web, adjacent the apertures to receive the studs, of such a shape and size as to overlap portions of the ears 13 and 14 when the shoes are positioned within the brake drum as shown in Figure 1. The lug 15 on the spider 12 is offset so that the edges of the flanges 23 bear against its face, as best shown in Figure 2, so that these flanges and the projections 27 serve to position the shoes in a transverse direction in relation to the spider and the drum, insuring that their webs lie in the plane of rotation of the transverse center of the drum.

Each of the ears 13 and 14 is provided with a perforation such as 28 and in the perforation in the uppermost ear, dependent upon which side of the vehicle the spider is mounted, is arranged the stud 29 having a loose fit therein. Secured to one end of this stud and eccentric thereto is the disk 30, upon which the flat undersurface of the projection 27 on the web of the upper brake shoe may rest. By this means the upper shoe is supported in proximity to the brake drum and thru the link 26 the lower shoe is suspended normally out of engagement with the brake drum. In order to provide for wear of the brake linings the stud 29 is arranged for rotation so that the eccentricity of the disk 30 may serve to adjust the position of the upper shoe. For this reason the end 31 of the stud, which is accessible when the brake drum is removed, is so shaped as to receive a suitable wrench. Between this end and the portion which passes loosely thru the ear 13 there is a threaded section on the stud to receive the lock nut 32 which can be tightened against the outer face of the ear 13 when the disk 30 has been turned to its proper position and will thus serve to clamp the eccentric disk against the inner face of the ear 13 and retain it in its adjusted position.

The unlinked ends of the brake shoes are adapted to be forced apart by any suitable mechanism in order to press the brake shoes into engagement with the drum when braking is desired. A suitable stop must be provided to prevent the shoes rotating with the drum when they are pressed into engagement therewith. Both of these functions are performed by the differential cam 33, which is here shown as one suitable, and the preferred means for applying the shoes. This cam is mounted upon a shaft 34 having bearings in an aperture 35 in the lug 15 on the brake spider. The shaft may be rotated by any suitable linkage from the usual brake pedal or lever. The flanges 23, which may better be termed cam followers, are adapted to always be retained in engagement with the upper and lower faces of the cam by means of the retractile spring 36 which thus serves three purposes; first, to maintain the shoes in engagement with the cam at all times to prevent rattling, second, to retract the shoes when the brake is released, and third, to support the lower shoe, at the cam end, from the upper shoe to keep it out of engagement with the drum when the brake is not in use. The ends of the spring 36 pass thru suitable apertures 37 in the webs of the brake shoes.

The operation of the brake is as follows; considering the drum to be rotating in the direction of the arrow, upon a rotation of the cam 33 the shoes are spread apart until they engage the brake drum. The upper shoe being against the cam is prevented from rotation by the drum, but the lower shoe is dragged by the drum, until the pressure of this shoe against the link 26 prevents further rotation thereof. This dragging of the lower shoe applies an additional effort, thru the link 26, to the upper shoe, serving to force it tightly into engagement with the drum and thus acting as a servo mechanism to make the brake partially self-acting. With a brake constructed according to this arrangement there is no movement tending to bend the shoes away from the drum and the brake may be considered as self-wrapping.

By using a differential cam rather than the usual type of symmetrical two lobed cam the braking is increased in the forward direction. It is to be noted that the upper surface of the cam, which is shown in Figure 1 in full lines as partially rotated and in dotted lines in its normal position, serves as a stop for the upper brake shoe. The inner and upper face of the cam is only slightly eccentric to the shaft 34 so that but little lift is given to the upper shoe when the cam is rotated. By virtue of this arrangement the reaction of the upper shoe, against the cam, under the force transmitted to it by the rotation of the brake drum, is but slightly displaced from the vertical center of the cam axis so that the lever arm and hence the force tending to close up the cam against the operator is slight. The lower and outer face of the cam has a much greater eccentricity and hence moves the lower shoe with greater rapidity and thru a greater distance to cause its initial engagement with the brake drum. The effort is applied to the lower shoe at a greater distance from the vertical center of the cam axis. By using the differential cam the slight movement of the upper face serves to take up slack of the upper shoe and the lower shoe is caused to first engage the drum but the taking up of the slack of the upper shoe prevents any sudden flopping of the two shoes when the drum takes hold and the brake is therefore quiet.

The conventional two shoed internal brake in which the brake shoes are pivoted in the usual manner at one end, to the spider is partially unwrapping and unequal pressure over its surface results. In the present construction, however, each shoe is free to float independently of the spider and hence equal pressure is applied throughout the whole arc of its lining, which therefore wears equally, and hence much longer.

The brake as above disclosed has the minimum number of parts, requires but little machining, and that not of an accurate character, and all of the parts are reversible. Hence but a single type of spider and a single type of shoe need be made for upper and lower and left and right brakes.

Having thus described the invention, what is claimed as new and desired to be secured by Letters Patent is:

1. In a vehicle brake, in combination, a rotatable brake drum, a relatively stationary brake spider, a pair of oppositely disposed identical brake members within said drum, said members being spaced apart at their ends and arranged one above and one below the horizontal axis of said drum, a free link pivotally connecting a pair of adjacent ends of said members, an extension on said spider toward the opposite ends of said brake members, combined operating and stop means carried by said extension, said extension engaging the sides of said members, the opposite side of said spider having a pair of ears symmetrically arranged in respect to said horizontal axis and each engaging the side of one of said members, adjustable support means adapted to be secured to either ear to support the link ends of said members and a spring between the opposite ends of said members to support the lower one.

2. In a brake, in combination, a brake drum, a brake spider, a pair of identical brake shoes within said drum, a free link pivotally connecting one set of adjacent ends of said shoes, means on said spider to support a stop for the opposite ends of said shoes, said means serving as a lateral guide for said ends, ears on the side of said spider opposite said means and symmetrically arranged in respect thereto, an adjustable support means on one of said ears for the link end of one of said shoes, said link ends being laterally guided by said ears and a resilient support for the opposite end of one of said shoes.

In testimony whereof I hereunto affix my signature.

EDWIN B. FLANIGAN.